United States Patent [19]

Ikeuchi

[11] Patent Number: 5,130,934
[45] Date of Patent: Jul. 14, 1992

[54] METHOD AND APPARATUS FOR ESTIMATING A POSITION OF A TARGET

[75] Inventor: Masayuki Ikeuchi, Yokohama, Japan

[73] Assignee: Kabushiki Kaisha Toshiba, Kawasaki, Japan

[21] Appl. No.: 552,070

[22] Filed: Jul. 13, 1990

[30] Foreign Application Priority Data

Jul. 14, 1989 [JP] Japan .................. 1-180299

[51] Int. Cl.$^5$ ............................. G01S 13/02
[52] U.S. Cl. ................... 364/516; 364/559; 364/459
[58] Field of Search ............... 364/516, 459, 434, 559; 244/164, 169

[56] References Cited

U.S. PATENT DOCUMENTS

| | | | |
|---|---|---|---|
| 4,320,287 | 3/1982 | Rawicz | 364/459 |
| 4,626,995 | 12/1986 | Lofgren et al. | 364/436 |
| 4,794,235 | 12/1988 | Burke et al. | 235/412 |
| 4,942,538 | 7/1990 | Yuan et al. | 364/513 |
| 4,959,800 | 9/1990 | Woolley | 364/516 |

Primary Examiner—Thomas G. Black
Attorney, Agent, or Firm—Oblon, Spivak, McClelland, Maier & Neustadt

[57] ABSTRACT

A position estimation apparatus is adapted to estimate the position of a target in the steps as will be set forth below. The target is observed four or more times by an image sensor during a time period in which the target and movable body unit move in those directions not parallel to each other. Acceleration is applied to an accelerator at least once at a time between the observation times. Two-dimensional angle information of the target's azimuth and elevation angles is detected from the image information of the target acquired by the image sensor at the time of observation. A coordinate system of the movable body unit is found in accordance with the position and attitude information of the movable body unit, and the two-dimensional angle information of the target is plotted on the coordinate system. Simultaneous equations are prepared by sequentially substituting the two-dimensional angle information of the target obtained through the observation into an equation of motion representing a regulator motion of the target initially entered on a position estimation apparatus. Parameters in the equation of motion is found from the simultaneous equations. The position of the target at a given time is estimated by substituting the parameters into the equation of motion and the given time into the latter equation.

2 Claims, 6 Drawing Sheets

METHOD AND APPARATUS FOR ESTIMATING A POSITION OF A TARGET

BACKGROUND OF THE INVENTION

1. Field of the Invention

The present invention relates to an apparatus mounted on a movable body unit which, in order to enable, for example, the movable body unit to approximate to a target, can estimate the position of the target and guide the movable body unit relative to the target and a method for estimating the position of a target.

2. Description of the Related Art

In recent times, a system has been developed so as to recover an object or objects left or thrown away by an unmanned space vehicle in the outer space. In order to enable a space vehicle which cannot be operated directly by an operator to be guided toward a target or object to be recovered, it is absolutely necessary that the target position be detected.

However, no effective means has been found available up to this day, except for a now available radar system's range finding function as will be set forth below. According to the radar system, it is possible to, like other space vehicles or crafts, radiate an electromagnetic wave to the target, to receive an echo, to measure required angle and time information and to find a target's position from a result of measurement. In the radar system currently relied upon, however, a large antenna needs to be mounted outside the space vehicle, dissipating a greater electric power for electromagnetic wave radiation. It is not suitable to a space vehicle calling for a compact, lightweight and low dissipation power unit.

This problem occurs not only in a rendezvous approach guidance of the space vehicle to the target but also in the approach guidance of a movable body unit to a regularly moving target, so long as the radar system is concerned.

SUMMARY OF THE INVENTION

Object of Invention

It is an object of the present invention to provide a position estimation apparatus for accurately measuring the position of a target from a movable body unit, such as a space vehicle, calling for compactness, lightweight and low dissipation electric power, without inflicting any heavy burden on a sensor accuracy.

According to the present invention, there is provided a position estimation apparatus mounted on a movable body unit to estimate a position in a given time of a target which moves regularly, which comprises:

an accelerator for applying acceleration to the movable body unit;

state detection unit for detecting position and attitude information of the movable body unit;

an image sensor for acquiring the target as an image from the movable body unit;

observation control unit for making four or more observations of the target, by said image sensor, during a period of time when the target and movable body unit are moved in those directions not parallel to each other and for applying acceleration by said accelerator to the moving body unit at least once at a point of time between the respective observations;

an angle information detecting unit for detecting two-dimensional angle information of target's azimuth and elevation angles from the image information of the target acquired by the image sensor at the time of observation;

a coordinate transformation unit for finding a coordinate system of the movable body un t at the time of observation in accordance with the information obtained by the state detection unit and for plotting, on the coordinate system, the two-dimensional angle information of the target which is obtained by the image sensor; and an arithmetic operation processing unit, initially stored with an equation of motion representing a regular motion of the target, for preparing simultaneous equations by sequentially substituting, into the equation of motion, the two-dimensional angle information of the target which is obtained through the observation, for finding parameters in the equation of motion from the simultaneous equations and for estimating a target position at a given time by substituting the parameters into the equation of motion and substituting given time data into the resultant equation of motion.

It is another object of the present invention is to provide a position estimation method for accurately measuring the position of a target from a movable body unit, such as a space vehicle, calling for compactness, lightweight and low dissipation electric power, without inflicting any heavy burden on a sensor accuracy.

According to the present invention, there is provided a position estimation method for estimating a position in a given time of a target of a regular motion, on a position estimation apparatus, comprising the steps of:

(1) entering into the position estimation apparatus an equation of motion representing the regular motion of the target;

(2) setting observation times four or more times during a period of time when the target and a movable body unit move in those directions not parallel to each other;

(3) applying acceleration to the movable body unit at least once during the period of time set by step (2);

(4) acquiring the target as an image at the observation time set by step (2) and detecting two-dimensional angle information of the target's azimuth and elevation angles from the image information;

(5) detecting position and attitude information of the movable body unit, finding a coordinate system of the movable body unit at the time of observation and plotting, on the coordinate system, the two-dimensional angle information of the target which is obtained by step (4); and (6) preparing simultaneous equations by sequentially substituting into the equation of motion the two-dimensional angle information at a respective time of observation obtained at step (5), finding parameters in the equation of motion from the simultaneous equations; and estimating a position in a given time of the target by substituting the parameters into the equation of motion and substituting the given time into the equation of motion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates a presently preferred embodiment of the invention and, together with the general description given above and the detailed description of the preferred embodiment given below, serves to explain the principles of the invention.

DETAILED DESCRIPTION OF THE PREFERRED EMBODIMENTS

An embodiment of the present invention will be explained below with reference to the accompanying drawings.

Figure 1:
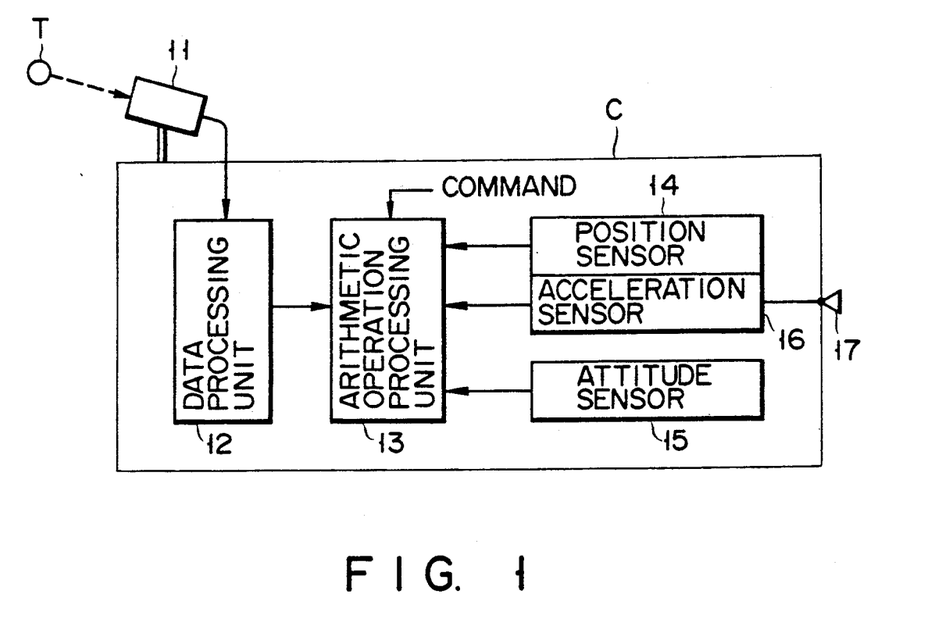
FIG. 1 is a block diagram showing an apparatus for estimating the position of a target according to an embodiment of the present invention.

FIG. 1 shows an arrangement of a position estimation apparatus according to the present invention. T and C denote a target and a chaser vehicle (space vehicle), respectively. The position estimation apparatus includes an image sensor 11, data processing unit 12, arithmetic operation processing unit 13, position sensor 14, attitude sensor 15, acceleration sensor 16 and accelerator (for example, a thruster) 17 and is borne on the space vehicle C.

Figure 2:
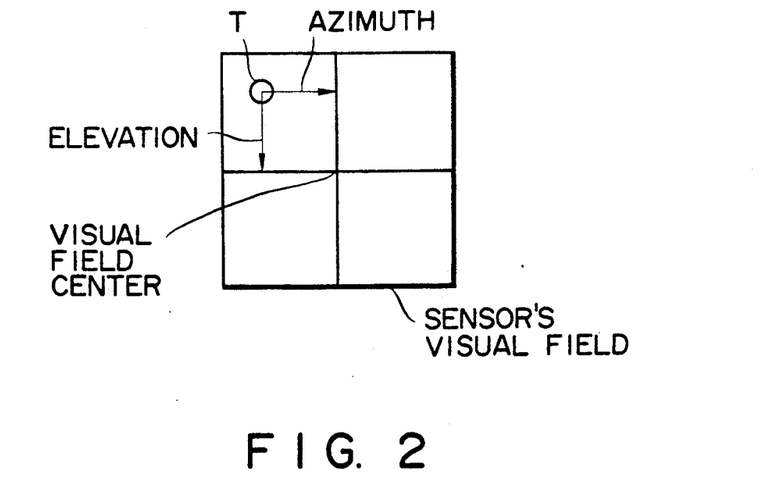
FIG. 2 is a view for showing a way of acquiring a target as an image by an image sensor of the apparatus of FIG. 1.

The image sensor 11 acquires the target T as an image as indicated in FIG. 2. The image data which is obtained at the image sensor 11 is sent to the data processing unit 12. The data processing unit 12 computes two-dimensional angle information, corresponding to the azimuth and elevation angles of the target T acquired as an image in the visual field of the sensor 11, from the image data. The angle information is sent to the arithmetic operation processing unit 13.

The position sensor 14 is composed of, for example, a GPS (global positioning system) receiver. The GPS receiver receives GPS signals sent from a plurality of artificial satellites, matches received PN code information to PN code information initially prepared, demodulates the received data to calculate position information of, and distance information from, the respective satellite, and derives its own position information from both the information. The position information of the GPS receiver is sent to the arithmetic operation processing unit 13.

The attitude sensor 15 is constructed of an inertial measurement unit a star sensor, earth sensor, sun sensor, etc. and detects a relative positional relation of a vehicle's own orbiting direction to the earth, to the stars, and to the sun. The attitude sensor 15 detects attitude information and delivers it to the arithmetic operation processing unit 13.

Based on a command coming from the arithmetic operation processing unit 13 as will be set forth below, the thruster imparts acceleration, for example, to the vehicle. The acceleration sensor 16 detects the vehicle's acceleration by, for example, an accelerometer, etc. The acceleration information is sent to the arithmetic operation processing unit 13.

The arithmetic operation processing unit 13 sets an acceleration time, as well as an observation time before and after the acceleration, in accordance with an observation command, such as a command from a corresponding earth station, accelerates the vehicle C at a time of acceleration and takes up, at a time of observation, two-dimensional angle information from the data processing unit 12, position information from the position sensor 14, attitude information from the attitude sensor 15 and acceleration information from the acceleration sensor 16, all these information being associated with the target T. The unit 13 specifically identifies the vehicle's own position from the position and attitude information, generates a coordinate system from the vehicle's own attitude with the orbiting direction of the vehicle as a axis and plots the two-dimensional angle information coming from the data processing unit 12.

The unit 13 implements a position estimation algorithm based on an initially entered equation of motion relating to the target T, that is, applies the equation of motion and the two-dimensional angle information with respective observation points plotted by coordinate transformation, evaluates a target's initial position and estimates the target's current position from the initial position above.

The apparatus thus arranged will be explained below in connection with its operation principle.

The apparatus acquires the target T as an image by the image sensor 11 and the vehicle receives the output data of the image sensor 11 and measures the azimuth and elevation angles of the target T thus acquired by the sensor 11. The apparatus detects the orbit and position of the vehicle C by the output data of the position sensor 14 and attitude sensor 15 and represents the vehicle's attitude, by the detection information, on the orbit coordinate system and plots the respective angle information of the target T on the orbit coordinate system with the velocity vector of the vehicle C as a reference. The information thus obtained is hereinafter referred to as measured angle information.

Figure 3A:
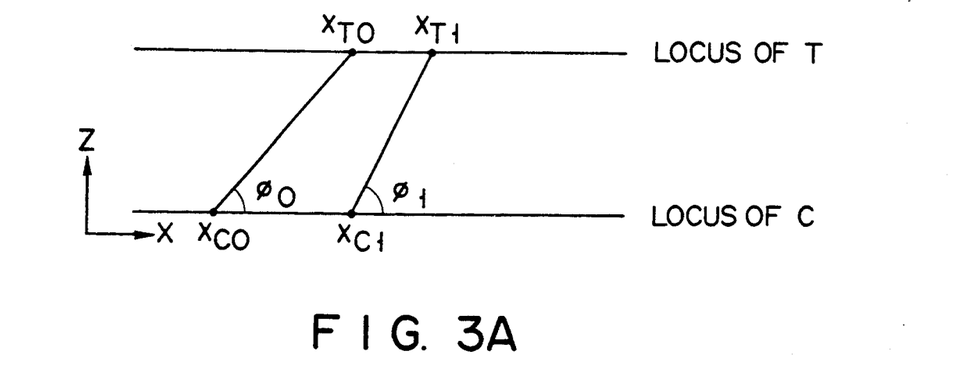
FIGS. 3A and 3B are explanatory views for explaining a method for estimating a relative position between a target and a space vehicle for the apparatus shown in FIG. 1.

The distance of the target T cannot always be estimated even if the aforementioned measured angle information is obtained. FIG. 3A shows the case where the distance of the target cannot be estimated and FIG. 3B shows the case where the distance of the target can be estimated.

It is assumed that, as shown in FIG. 3A, the target T "on orbit" and vehicle C are moved in uniform motion in a direction parallel to the X axis on an X, Z coordinate system. At time $t_0$, the target T is orbited at a location $X_{T0}$ and the vehicle C at a location $X_{C0}$. At time $t_1$, the target T is orbited at a location $X_{T1}$ and the vehicle C at a location $X_{C1}$. In this case, the position and velocity of the target T cannot be estimated even if the measured angle information $\phi_0$ and $\phi_1$ of the target T are gained at those positions corresponding to times $t_0$ and $t_1$ of the vehicle C. It is, therefore, not possible to estimate their relative distance.

Figure 3B:
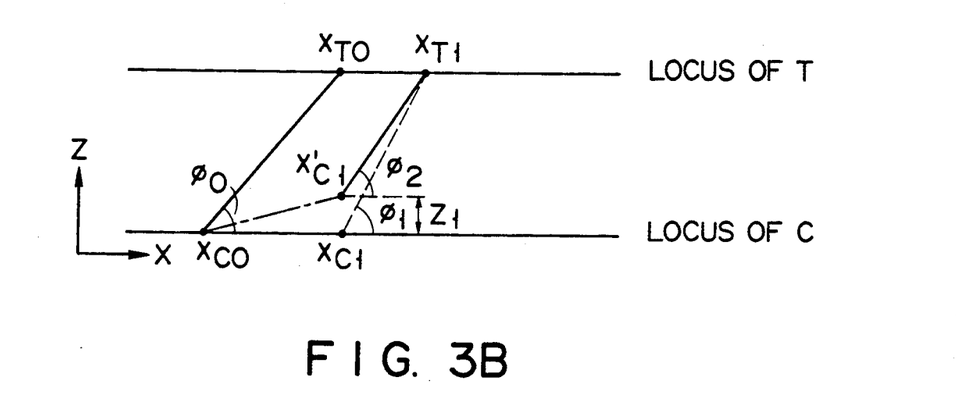

In FIG. 3B, on the other hand, it is assumed that the vehicle C moves a distance $Z_1$ from an orbiting position parallel to a Z-axis direction, when a time $t_1$ is reached, to that position $X_{C1}'$. The distance $Z_1$ represents a parallax. If the parallax $Z_1$ and measured angle information $\phi_0$ and $\phi_2$ are used, it is possible to geometrically estimate the position and velocity of the target T and further to estimate a relative distance of the vehicle to the target T.

However, the method for measuring or predicting the parallax $Z_1$ will be in open loop relating to the position estimation of the target T. Thus the accuracy with which the parallax $Z_1$ is measured or predicted is related directly to the position estimation error of the target T, failing to compensate for it with adequate accuracy in the current level of the sensor technique. This method sometimes encounters theoretical impossible conditions upon the estimation of the target's position and velocity or sometimes inflicts a heavy burden on the accuracy of the sensor even if it is possible to estimate the position and velocity of the target T.

The present embodiment operates on a principle set forth below.

Figure 4:
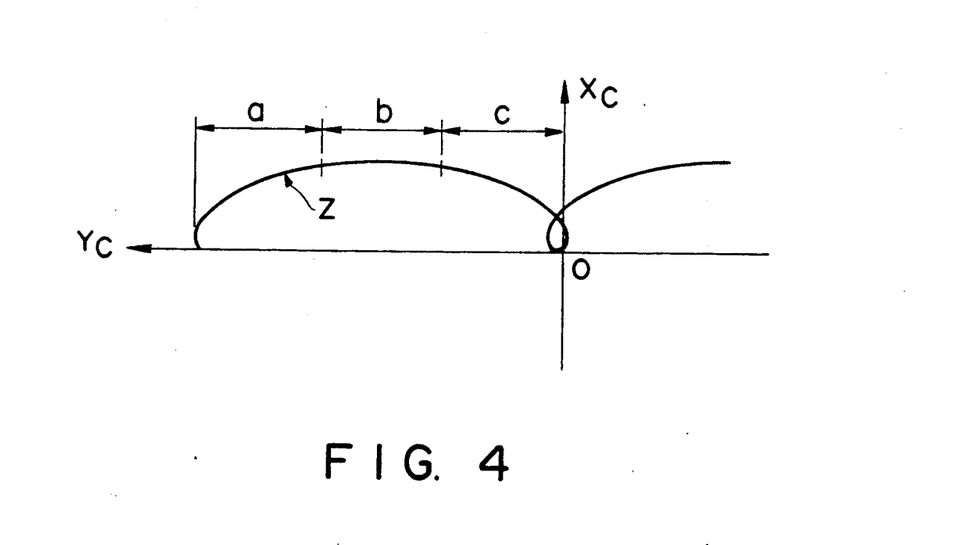
FIG. 4 is a view showing a relative locus of the target to the space vehicle, which explains an operation principle of the apparatus shown in FIG. 1.

Let it be assumed that the target T goes around the earth in circular orbit and that the vehicle C is guided into a visual range of the target T and moves in elliptic orbit relative to the orbit of the target T. It is thus assumed that the vehicle C and target T move in relative orbits as shown in FIG. 4. If, in this case, the vehicle C orbits in a range a or a range c, then the position of the target T can be positively estimated as set forth in connection with FIG. 3B because the vehicle's orbit is not parallel to the orbit of the target T. If, on the other hand, the vehicle C orbits in a range b, the orbits of the target T and vehicle C are substantially parallel to each other, failing to properly estimate the position of the target T as set forth in connection with FIG. 3A. Here, the position of the target T is estimated by finding an equation of motion of the target T in the range a with a time as a parameter and substituting a given time into the equation of motion.

The position estimation method of the target T will be explained below with reference to FIG. 5.

Figure 5:
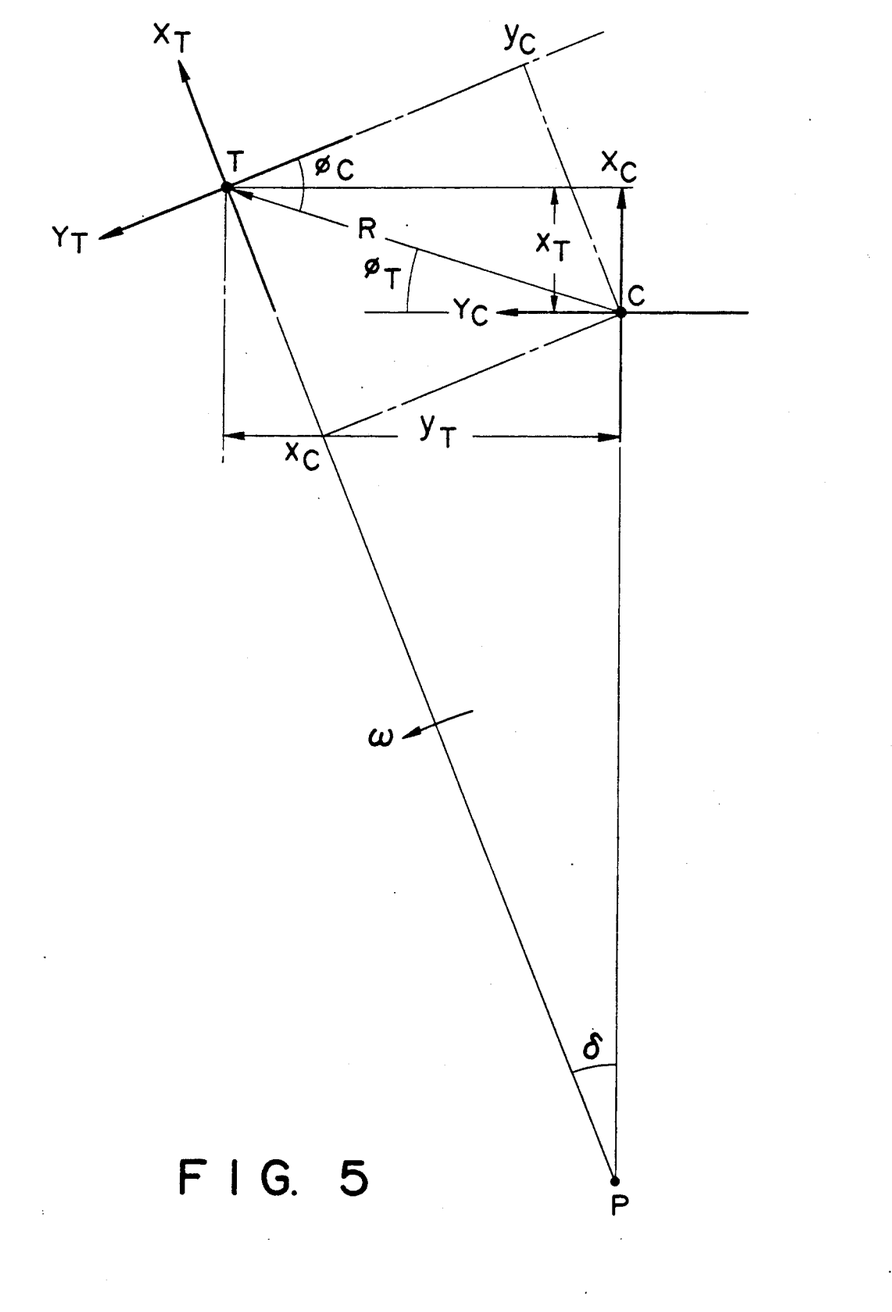
FIG. 5 is a view showing a positional relation between the target and the space vehicle, which explains a method for estimating the position of the target using the present apparatus.

Let it be assumed that the target T and vehicle C are located in such a positional relation as shown in FIG. 5. By way of example, here, the coordinate axes $X_T$ and $X_C$ are set in those directions connecting the target T and vehicle C to the center P of the earth and the coordinate axes $Y_T$ and $Y_C$ are set in the orbiting directions of the target T and vehicle C and in those directions perpendicular to the coordinate axes $X_T$ and $X_C$. The characters $x_C$ and $y_C$ show the coordinate of the vehicle C as seen from a $(X_T, Y_T)$ coordinate in FIG. 5 and the characters $x_T$ and $y_T$ show the coordinate of the target T as seen from a $(X_C, Y_C)$ coordinate system. In FIG. 5, $\phi_C(=\phi_T+\delta)$ represents the elevation angle of the vehicle side; $\phi_T$, the elevation angle of the target side; R, a relative distance between the target T and the vehicle C; $\delta$, an earth's central angle formed between a line P-T and a line P-C, and $\omega$, a circumnavigation rate (an angular velocity: rad/sec.) of the target T with the earth as a center. It is to be noted that the target T has its presence recognized by the image sensor 11 as the azimuth and elevation angles, but that in FIG. 5 the azimuth angle is omitted for brevity in explanation.

The elevation angle $\phi_T$ from the vehicle C to the target T is measured with the aforementioned coordinates so set. The coordinate system $(X_C, Y_C)$ of the vehicle C can be estimated by the position sensor 14. The elevation angle which is found from the output data of the image sensor 11 is measured with the body of the vehicle C as a reference and hence it is necessary to, at that time, know what attitude the vehicle C assumes relative to the coordinate system $(X_C, Y_C)$. The attitude is measured by the attitude sensor 15 and, by so doing, the vehicle's elevation in the visual field of the image sensor 11 is transformed to the elevation angle $\phi_T$ of the vehicle's coordinate system. The same thing is also done for the azimuth, though being not shown in FIG. 5.

As will be seen from the above, the position of the target T with the vehicle C as a center can be expressed with the use of an equation of motion below.

$$\underline{X}_T = \Phi(t, \omega) \cdot \underline{X}_{T0} \tag{1}$$

where $$\underline{X}_T = (x_T, y_T, \dot{x}_T, \dot{y}_T)$$

$$\underline{X}_{T0} = (x_{T0}, y_{T0}, \dot{x}_{T0}, \dot{y}_{T0})$$

where
  $\dot{X}, \dot{Y}$: the time differentiation (velocity) of x, y;
  $\underline{X}_{T0}$: the initial position and velocity of the target T;
  $\Phi(t, \omega)$: 4 rows × 4 columns matrix;
  t: an elapsed time from $\underline{X}_{T0}$; and
  $\omega$: a circumnavigation rate (angular velocity: rad/sec.).

Equation (1) can be given below:

$$\begin{bmatrix} x_T \\ y_T \\ \dot{x}_T \\ \dot{y}_T \end{bmatrix} = \begin{bmatrix} 4-3\cos\omega t, & 0, & (1/\omega)\sin\omega t, & (2/\omega)(1-\cos\omega t) \\ 6(\sin\omega t - \omega t), & 1, & (2/\omega)(\cos\omega t - 1), & (4/\omega)\sin\omega t - 3t \\ 3\omega\sin\omega t, & 0, & \cos\omega t, & 2\sin\omega t \\ 6\omega(\cos\omega t - 1), & 0, & -2\sin\omega t, & 4\cos\omega t - 3 \end{bmatrix} \begin{bmatrix} x_{T0} \\ y_{T0} \\ \dot{x}_{T0} \\ \dot{y}_{T0} \end{bmatrix}$$

If the initial state (the initial position and velocity) of the target T, that is, the unknown quantity of the equation above, is found, it is possible to estimate the position of the target T at a given time by substituting the given time into the equation. The estimation is made by a position estimation algorithm as set out below.

Now suppose that the estimated initial value $\underline{X}_{T0}$ is a true initial value $\underline{X}_{T0}^*$. Then the estimation value $\phi_T^*$ of the elevation angle $\phi_T$ becomes $$\phi_T^* = \arctan(x_T^*/y_T^*)$$

$$x_T{}^* = x_T(\underline{X}_{T0}{}^*, t, \omega)$$

$$y_T{}^* = y_T(\underline{Y}_{T0}{}^*, t, \omega)$$

in agreement with a corresponding observation point. Since, therefore, $\underline{X}_T{}^*$ is not obtained during a position estimation, it is estimated as $\underline{X}_{T0}$. Here, the elevation angle $\phi_T$ becomes $$\hat{\phi}_T = \arctan(\hat{x}_T/\hat{y}_T)$$

and is calculated by the arithmetic operation processing unit 13 without using the image sensor 11. Using Equation (1), a calculation $$\underline{\hat{X}}_T = \Phi(t, \omega)\underline{\hat{X}}_{T0}$$

is made to find the elements $\hat{x}_T$, $\hat{y}_T$ of $\underline{\hat{X}}_T$.

Then a difference $\delta\phi$ between the observed value and the estimation value is calculated by an equation given by:

$$\delta\phi = \phi_T{}^* - \hat{\phi}_T \tag{2}$$

Given $$\delta\underline{X} = \underline{X}_{T0}{}^* - \underline{\hat{X}}_{T0} = \begin{bmatrix} x_{T0}{}^* - \hat{x}_{T0} \\ y_{T0}{}^* - \hat{y}_{T0} \\ \dot{x}_{T0}{}^* - \hat{\dot{x}}_{T0} \\ \dot{y}_{T0}{}^* - \hat{\dot{y}}_{T0} \end{bmatrix},$$

then Equation (2) can approximate to the following equation:

$$\delta\underline{\phi} = (\partial\phi/\partial\underline{X})\underline{\hat{X}}_{T0}, t, \omega \cdot \delta\underline{X} \tag{3}$$

By observing the elevation angle $\phi_{T(T=1, 2, 3, 4)}$ at respective times $t_1$, $t_2$, $t_3$, $t_4$ by these processings, it is possible to find an equation given below.

$$\begin{bmatrix} \delta\phi_1 \\ \delta\phi_2 \\ \delta\phi_3 \\ \delta\phi_4 \end{bmatrix} = \tag{4}$$

$$\begin{bmatrix} \left(\frac{\partial\phi}{\partial x_0}\right)_{\underline{\hat{X}}_0, t_1} & \left(\frac{\partial\phi}{\partial y_0}\right)_{\underline{\hat{X}}_0, t_1} & \left(\frac{\partial\phi}{\partial \dot{x}_0}\right)_{\underline{\hat{X}}_0, t_1} & \left(\frac{\partial\phi}{\partial \dot{y}_0}\right)_{\underline{\hat{X}}_0, t_1} \\ \vdots & & & \\ \left(\frac{\partial\phi}{\partial \phi_0}\right)_{\hat{x}, t_4} & & & \left(\frac{\partial\phi}{\partial \dot{y}_0}\right)_{\hat{x}, t_4} \end{bmatrix}$$

$$\begin{bmatrix} \delta x_0 \\ \delta y_0 \\ \delta \dot{x}_0 \\ \delta \dot{y}_0 \end{bmatrix}$$

$$\delta\underline{\phi} = P(\underline{X}_0, t_1, t_2, t_3, t_4)\delta\underline{X}$$

Here, $\delta\underline{X}$ is composed by Equation (4) for unknown parameters (any parameters, if known, are zeros each) of $\delta x_0$, $\delta y_0$, $\delta\dot{x}_0$, $\delta\dot{y}_0$. Of those elements of the matrix, an element corresponding to $\delta\overline{X}$ is selected to compose a matrix $\overline{P}$. For $\delta\underline{\phi}$, those elements necessary to find $\delta\overline{X}$ are taken out to given $$\delta\overline{\phi} = \overline{P}(\underline{\hat{X}}_0, t_1, t_2, t_3, t_4)\delta\overline{X} \tag{5}$$

Since the unknown parameter of Equation (5) is $\delta X$, $$\delta\overline{X} = \overline{P}^{-1}(\underline{\hat{X}}_0, t_1, t_2, t_3, t_4)\delta\overline{\phi} \tag{6}$$

As set forth earlier, it is necessary to impart a motion to the vehicle C in $\overline{P}^{-1}$ non-singular form and the vehicle C is accelerated by the accelerator 17 in the presence of $P^{-1}$, the acceleration control of which will be set forth below with reference to FIG. 6.

Figure 6:
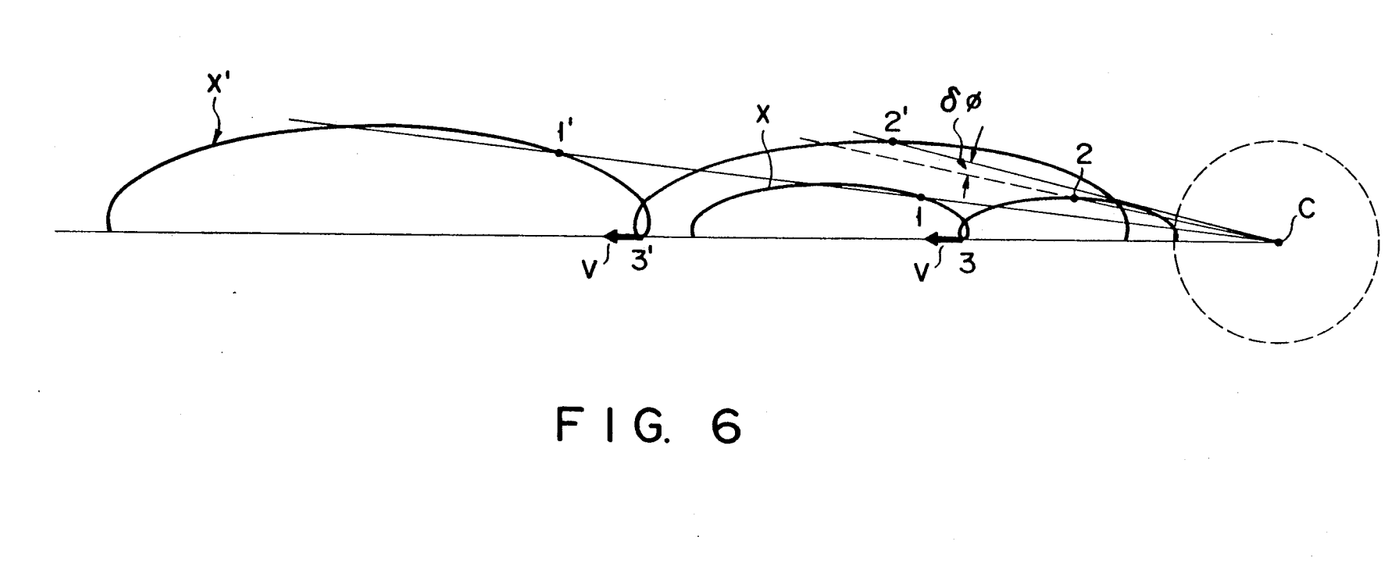
FIG. 6 is a view showing a comparison between a true locus and a prediction locus prior to position estimation concerning a relative locus of the target to the space vehicle for the present apparatus.

Upon comparing a target's true orbit and a prediction orbit before position estimation regarding to the relative position between the target T and the vehicle C, both have a similarity relation as shown in FIG. 6, that is, elevation direction information (the same thing can be said for the azimuth information) acquired by the image sensor 11 offers the same elevation angle whether the target T is located at a position 1 on the true orbit x or at a position 1' on the prediction orbit x' before position estimation. In this case, a vector $\delta X$ may take any quantities for the vector $\delta\phi$ in Equation (4) on the algorithm, meaning that $p^{-1}$ is not present.

However, an angle difference $\delta\phi$ is generated when a comparison is made between measured angle information (the elevation angle when the target T is at a position 2 on the true orbit x) obtained by applying acceleration to the vehicle C, for example, at a location 3 in FIG. 6 and measuring a corresponding angle after lapse of a certain period of time and measured angle information (the elevation angle when the target T is a position 2' on a prediction orbit X' before position estimation) obtained by applying the same acceleration as set out above to the vehicle C at a location 3' on a prediction orbit before position estimation and analyzing a corresponding angle after the lapse of the same period of time as set out above.

Figure 7:
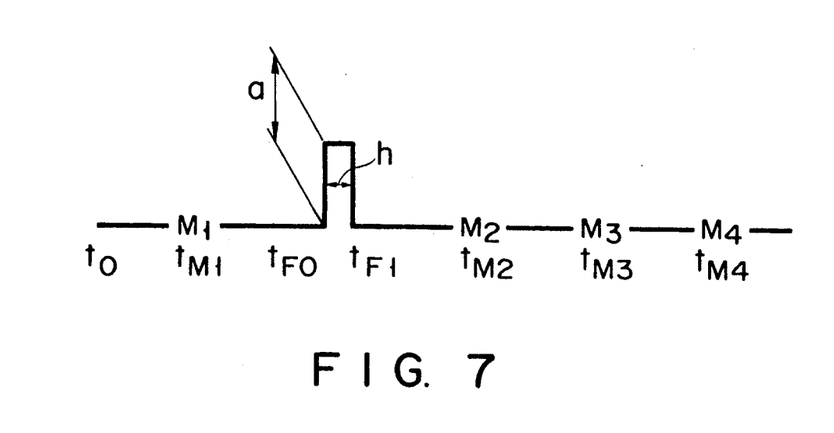
FIG. 7 is a view showing a relation between a time for acquiring measurement information for enabling the position of the target to be estimated with the use of an image sensor and an acceleration applying time.

In view of such a phenomena as set out above, it is possible to acquire the presence of $\overline{P}^{-1}$ by performing such control as shown in FIG. 7. In FIG. 7, $M_1$ to $M_4$ mean the obtaining of measured angle information by the vehicle C and $t_{M1}$ to $t_{M4}$ represent a timing for obtaining measured information. In FIG. 7, reference letter a represents the magnitude of acceleration under the action of the accelerator 17 and h, the generation time of the acceleration a. The feature of this control comprises starting the acceleration generation of the accelerator 17 at time $t_{F0}$ in a range between the times $t_{M1}$ and $t_{M2}$ and stopping the accelerator 17 at time $t_{F1}$ between them. Based on the measured angle information obtained at the observation time $t_{M1}$ before the start of the acceleration generator, and at respective observation times $t_{M2}$, $t_{M3}$, and $t_{M4}$ after stopping the acceleration generation, it is possible to find such four of angle difference of Equation (2) that make P non-singular, then it is possible to acquire $\overline{P}^{-1}$ for finding the initial unknown state of the target T by computing Equations (1) to (6).

Figure 8:
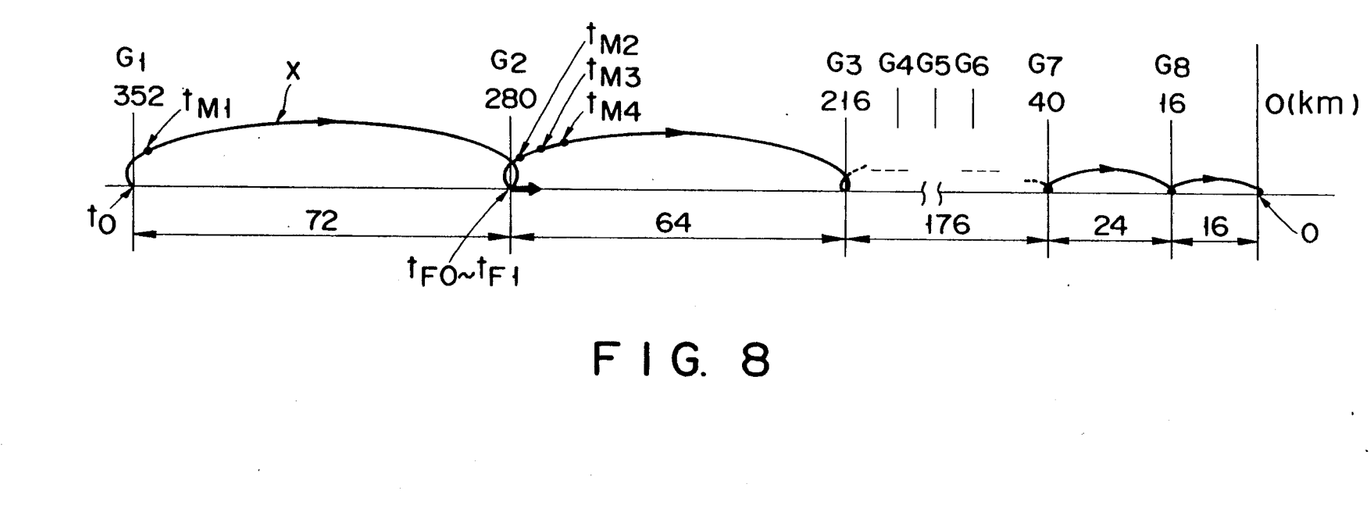
FIG. 8 is a view showing a relative locus of the target to the space vehicle when the timing of FIG. 7 is applied to an achievable route of the target.

The control at times $t_{M1}$ to $t_{M4}$, $t_{F0}$, $t_{F1}$ as shown in FIG. 7, if being implemented on an actual orbit, can be represented as shown, for example, in FIG. 8. With the center-of-gravity position of the vehicle C as an origin 0, the vehicle C is so guided that the target T moves on the orbit x as shown in FIG. 8, where $t_0$ represents an initial time; $t_{F0}$ to $t_{F1}$, a period at which acceleration is generated; $t_{M1}$ to $t_{M4}$, times at which measured angle information is acquired; and $G_1$ to $G_8$, respective targeting positions as milestones at which the vehicle C is guided into closest proximity to the target T.

Assume that, in FIG. 8, the target T is moved into closest proximity to the vehicle C at time $t_0$ at a location $G_1$ (a location 352 km from an origin 0) with the center-of-gravity position of the vehicle as the origin 0. The location $G_1$ can be roughly estimated through the observation from ground stations. A first angle measurement is carried out at time $t_{M1}$ at which the target T is on orbit not parallel to that on which the vehicle C moves. A second closest proximity point $G_2$ (a location 280 km from the origin 0) can also be roughly estimated by the observation from ground stations. Now acceleration is applied to the vehicle C at a time interval between prediction times $t_{F0}$ and $t_{F1}$ at which the target T will move past the location $G_2$. Subsequent angle measurements are made at time $t_{M2}$, $t_{M3}$, $t_{M4}$ at which the target T moves on orbit not parallel to that on which the vehicle C moves. The processing from Equations (1) to (6) is implemented. using measured angle information before and after acceleration, obtaining $\overline{P}^{-1}$. It is thus possible to find the initial state (initial position and velocity) of the target T at the location $G_1$.

The same processing is repeated at the location $G_2$ and the following so as to find the initial state of the target T. As the relative position of the vehicle C to the target T becomes nearer to each other, it is possible to increase the accuracy with which the position of the target T is estimated. Eventually, a value $\underline{X}_{T0}^*$ corresponding to a true position of the target T becomes

$$\underline{X}_{T0}^* = \hat{\underline{X}}_{T0} + \delta \underline{X}$$

In actual practice, it is not sufficient at all time to complete the evaluation of $\underline{X}_{T0}^*$ in a single computation. Given that $$(\underline{X}_{T0})_{N+1} = (\hat{\underline{X}}_{T0})_N + \delta \underline{X}_N$$
(provided, N=1, 2, 3, ...) (7)

the calculation of Equations (1) to (6) is repeatedly performed until the absolute value $|\delta \underline{\phi}|$ of $\delta \underline{\phi}$ becomes sufficiently small and a result of computation, that is, $(\hat{\underline{X}}_{T0})_{N+1}$, is interpreted as being equal to $\underline{X}_{T0}^*$. The aforementioned position estimation algorithm, upon being arranged, will be given below.

The aforementioned position estimation algorithm is stored in the arithmetic operation processing unit 13. Now the operation of the apparatus as shown in FIG. 1 will be explained below with reference to FIG. 9.

Figure 9:
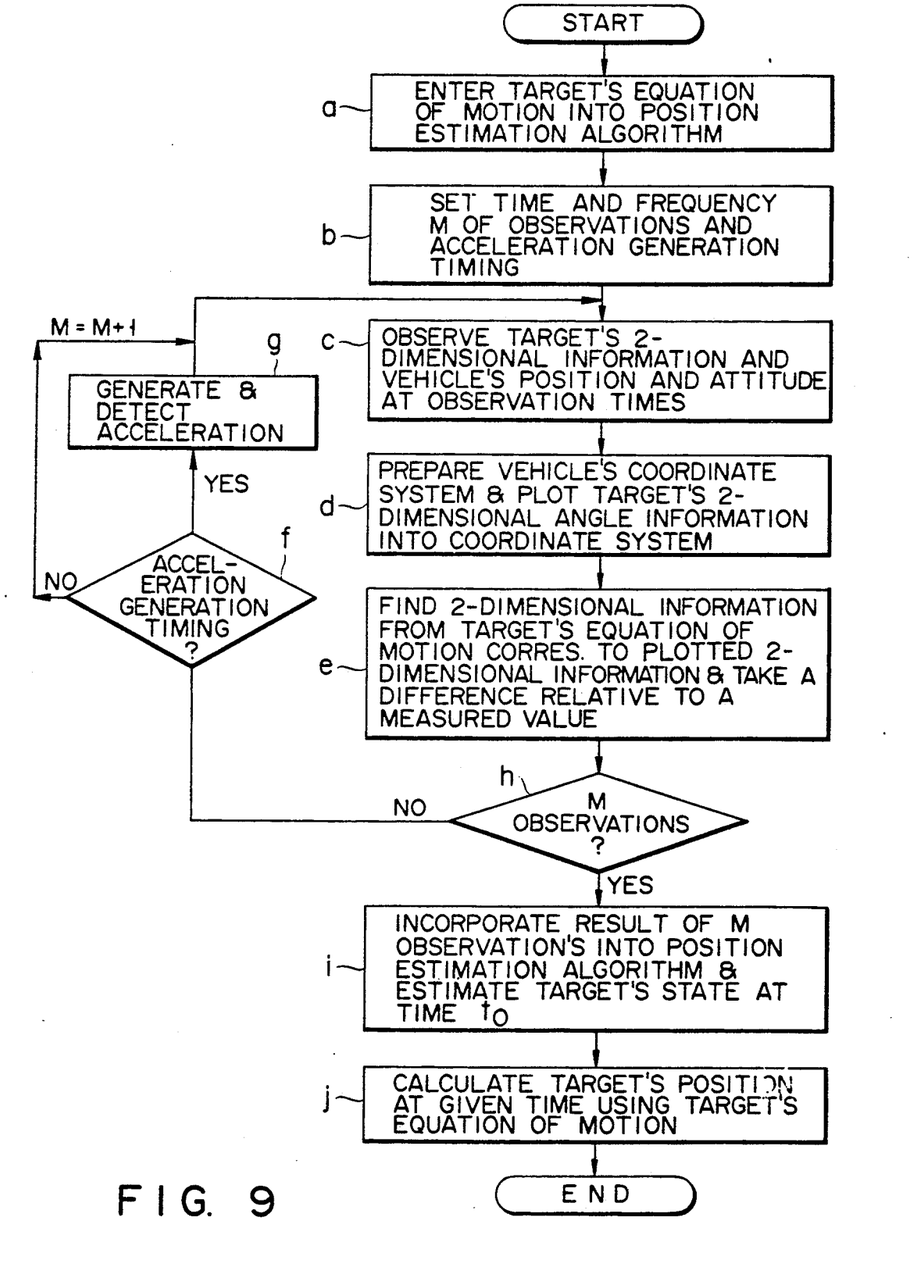
FIG. 9 is a flowchart for explaining a position estimation operation of the present apparatus.

The equation of motion of the target T—Equation (1)—is entered in the position estimation algorithm at step a. Then step b sets the observation time, number of times of observations, M, and acceleration generation timing.

Step c finds target's two-dimensional angle information (azimuth and elevation measurements) from the output data of the image sensor 11 when an observation time is reached at which the vehicle C moves into a visual range of the target T and, at the same time, finds position and attitude information of the vehicle C. Step d prepares a coordinate system of the vehicle C from the position and attitude information and subjects the two-dimensional angle information of the target T to a coordinate transformation. At step e, two-dimensional angle information (estimation value) corresponding to the two-dimensional angle information subjected to the coordinate transformation is analytically evaluated based o the target's equation of motion to take a difference with respect to an associated measured value. At step f, it is determined whether or not an acceleration generation time set at step b is reached during a period of time at which M number of times of observations is not reached. When M number of times of observations is reached, step g applies acceleration to the vehicle C at that time and detects it.

After steps a to e are repeated M number of times at step h, step i enters a result of M observations into the position estimation algorithm and estimates the state of the target T at time $t_0$. Step j computes the position of the target T at a desired time with the use of the analytical equation of motion of the target T.

The aforementioned position estimation apparatus can estimate the position of a target T at a given time in spite of using the image sensor 11 having no range finding function in particular. If calculated values of parameters are updated through a continuous observation, an accurate position estimation can be performed as the vehicle C comes nearer to the target T. Since the image sensor 11 only is mounted outside the vehicle C, there is almost no restriction on the mounting of any external device. The mere use of the image sensor 11 as an external device ensures a very small dissipation power and hence a compact light-weight vehicle C.

The present invention is not restricted to the aforementioned embodiment and can be applied to, for example, a self-propelled robot capable of, for example, avoiding a hindrance by radiating an electromagnetic wave and an automobile's alarm device capable of estimating where an approaching automobile diagonally from behind is run upon a change from one traffic line to another on the road, that is, upon the indication of a direction by a direction indicator and sounding a buzzer if it is run in a dangerous area on the road. Various changes or modifications of the present invention can be made without departing from the spirit and scope of the present invention.

Additional advantages and modifications w 11 readily occur to those skilled in the art. Therefore, the invention in its broader aspects is not limited to the specific details, representative devices, and illustrated examples shown and described. Accordingly, various modifications may be made without departing from the spirit or scope of the genera inventive concept as defined by the appended claims and their equivalents.

What is claimed is:

1. A position estimation apparatus mounted on a movable body unit to estimate a position in a given time of a target which moves regularly, which comprises:
   an accelerator for applying acceleration to the movable body unit;
   state detection means for detecting position and attitude information of the movable body unit;
   an image sensor for acquiring the target as an image from the movable body unit;
   observation control means for making four or more observations of the target, by said image sensor, during a period of time when the target and movable body unit are moved in those directions not parallel to each other and for applying acceleration by said accelerator to the moving body unit at least once at a point of time between the respective observations;
   angle information detecting means for detecting two-dimensional angle information of target's azimuth and elevation angles from the image information of the target acquired by the image sensor at the time of observation;
   coordinate transformation means for finding a coordinate system of the movable body unit at the time of observation in accordance with the information obtained by the state detection means and for plotting, on the coordinate system the two-dimensional angle information of the target which is obtained by the image sensor; and
   arithmetic operation processing means, initially stored with an equation of motion representing a regular motion of the target, for preparing simultaneous equations by sequentially substituting, into the equation of motion, the two-dimensional angle information of the target which is obtained through the observation, for finding parameters in the equation of motion from the simultaneous equations and for estimating a target position at a given time by substituting the parameters into the equation of motion and substituting given time data into the resultant equation of motion.

2. A position estimation method for estimating a position in a given time of a target of a regular motion, on a position estimation apparatus, comprising the steps of:
   (1) entering into the position estimation apparatus an equation of motion representing the regular motion of the target;
   (2) setting observation times four or more times during a period of time when the target and a movable body unit move in those directions not parallel to each other;
   (3) applying acceleration to the movable body unit at least once during the period of time set by step (2);
   (4) acquiring the target as an image at the observation time set by step (2) and detecting two-dimensional angle information of the target's azimuth and elevation angles from the image information;
   (5) detecting position and attitude information of the movable body unit, finding a coordinate system of the movable body unit at the time of observation and plotting, on the coordinate system, the two-dimensional angle information of the target which is obtained by step (4); and
   (6) preparing simultaneous equations by sequentially substituting into the equation of motion the two-dimensional angle information at a respective time of observation obtained at step (5), finding parameters in the equation of motion from the simultaneous equations; and
   estimating a position in a given time of the target by substituting the parameters into the equation of motion and substituting the given time into the equation of motion.

* * * * *